United States Patent [19]

Doane

[11] Patent Number: 4,614,643

[45] Date of Patent: Sep. 30, 1986

[54] PROCESS FOR TREATING LIQUID CHLORINATED HYDROCARBON WASTES CONTAINING IRON

[75] Inventor: Elliott P. Doane, Monroe, Conn.

[73] Assignee: Stauffer Chemical Company, Westport, Conn.

[21] Appl. No.: 447,840

[22] Filed: Dec. 8, 1982

[51] Int. Cl.$^4$ ............................................. C01G 49/10
[52] U.S. Cl. ................................. 423/140; 423/462; 423/493; 423/496; 570/250; 570/262; 210/702; 210/755; 210/767
[58] Field of Search ............... 423/462, 493, 496, 140; 570/250, 262; 210/702, 755, 767

[56] References Cited

U.S. PATENT DOCUMENTS

| 3,115,528 | 12/1963 | Benner, Jr. et al. | 570/262 |
| 3,647,895 | 3/1972 | Fruhwirth et al. | 570/262 |
| 3,691,239 | 9/1972 | Hackett et al. | 570/262 |
| 4,307,261 | 12/1981 | Beard, Jr. et al. | 570/262 |

FOREIGN PATENT DOCUMENTS

| 2540292 | 6/1975 | Fed. Rep. of Germany . |
| 1939391 | 3/1977 | Fed. Rep. of Germany . |
| 41-13606 | 7/1966 | Japan . |
| 1380497 | 1/1975 | United Kingdom . |

Primary Examiner—John Doll
Assistant Examiner—Robert L. Stoll
Attorney, Agent, or Firm—Joel G. Ackerman

[57] ABSTRACT

Ferric chloride contained in liquid waste streams comprising higher boiling chlorinated hydrocarbons may be substantially reduced by contacting the waste stream with an amount of water sufficient to convert a substantial amount of the ferric chloride in said stream to solid ferric chloride hexahydrate, and then removing the solid hexahydrate from the waste stream for instance by filtration.

7 Claims, 1 Drawing Figure

PROCESS FOR TREATING LIQUID CHLORINATED HYDROCARBON WASTES CONTAINING IRON

BACKGROUND AND PRIOR ART

This invention relates to the treatment of liquid chlorinated hydrocarbon streams, particularly waste streams, containing ferric iron impurities, to produce streams having a reduced iron content.

A number of valuable chlorinated hydrocarbons such as methyl chloride, methylene chloride, chloroform, carbon tetrachloride, 1,2-dichloroethane, 1,1-dichloroethane, 1,1,2-trichloroethane, trichloroethylene, perchloroethylene, ethyl chloride, 1,1,1-trichloroethane, allyl chloride, chlorobutenes, chloroprene, and mono- and polychlorinated benzenes, are conventionally produced by processes in which in one or more steps ferric chloride is employed as a catalyst or is formed by corrosion of steel or steel alloy equipment by process chemicals including chlorine and hydrogen chloride. In such processes, there are generated one or more waste streams containing, in addition to the desired product or products, more highly chlorinated or oligomeric by-products (generally referred to as "heavy ends"). Such streams are generally obtained by separation of the desired product from by-products in one or more distillation columns. These heavy ends streams generally contain substantial amounts of iron compounds (usually in the form of ferric chloride) which represent primarily ferric chloride used as a catalyst in one or more upstream processes steps, and often also some resulting from corrosion. In general, these chlorinated hydrocarbon streams or heavy ends are ultimately disposed of by thermal or catalytic incineration or oxidation, for instance, in a high temperature thermal incinerator or by fluidized bed catalytic incineration or oxidation. Optionally, prior to incineration the heavy ends streams may first be concentrated in a tar still or other equipment, from which additional desired products may be recovered as overhead and a more concentrated heavy ends as bottoms product.

For instance, such heavy ends streams are formed in commercial facilities for the production of vinyl chloride from ethylene and chlorine, and may emanate from one or more units in such a plant.

In such a commercial plant, ethylene is reacted with chlorine, in a liquid phase reactor (the liquid medium being primarily 1,2-dichloroethane together with other chlorinated hydrocarbons such as 1,1,2-trichloroethane) with ferric chloride being employed as a chlorination catalyst. The chlorination may be carried out at temperatures of between about 40° and 60° C. (so-called "low temperature" chlorination) with a comparatively low concentration of ferric chloride catalyst being employed (generally approximately 50 ppm), or at a temperature at or above the normal boiling point of 1,2-dichloroethane, i.e., 83.5° C. or above (generally up to about 110°-120° C., so-called "high temperature" chlorination). Ferric chloride is also utilized as a catalyst here, but in substantially larger amounts.

If the chlorination is of the "high temperature" type, the 1,2-dichloroethane is vaporized in the chlorination reactor and fractionally distilled in an associated fractionated column, following which it is passed into a pyrolysis or cracking furnace in which it is thermally dehydrochlorinated to produce vinyl chloride and hydrogen chloride. Optionally, the dehydrochlorination may be carried out catalytically. The gaseous products leaving the dehydrochlorination step are quenched, usually by direct contact with a liquid, usually recycled 1,2-dichloroethane, and passed to product separation in which vinyl chloride, hydrogen chloride, and un-cracked 1,2-dichloroethane are ultimately recovered.

If the chlorination is of the "low temperature" type, 1,2-dichloroethane is continuously removed from the chlorination reactor and eventually distilled in a series of fractionating columns. These columns are generally divided into two sections, termed "light ends" and "heavy ends" distillation. In the light ends column or columns, low boiling impurities are separated from the dichloroethane, which is removed as a bottoms product and passed into the heavy ends column or columns. In the latter, dichloroethane is taken out as an overhead product and higher boiling impurities removed as bottoms product. The heavy ends are usually concentrated in a "tar still", which may be a kettle or type of distillation apparatus, or by vacuum distillation, with the residue being passed to incineration or oxidation.

In such processes there are several primary sources of waste streams containing chlorinated hydrocarbons and also containing ferric chloride which may be treated by the process of the present invention. These streams include:

(a) a purge stream taken off the ethylene chlorination reactor to prevent the undesirable build-up of high boiling by-products;

(b) the bottoms product from the heavy ends distillation section;

(c) the residue contained in the concentration apparatus after separation of desired product 1,2-dichloroethane; and (d) residues remaining after purification and recovery of 1,2-dichloroethane recovered unconverted from the pyrolysis furnace or other dehydrochorination step.

The above mentioned waste streams will contain a number of chlorinated hydrocarbons including for example 1,2-dichloroethane, 1,1-dichloroethane, dichloroethylenes, trichlorethylene, perchloroethylene, 1,1,2-trichloroethane, 1,1,1-trichloroethane(methylchloroform), 1,1,2,2-tetrachloroethane; penta- and hexachloroethanes, and chlorobutadienes such as chloroprene.

Processes for the production of other chlorinated hydrocarbons, for instance, products such as perchloroethylene, 1,1,2-trichloroethane, ethyl chloride, allyl chloride, 1,1-dichloroethane, chlorinated benzenes and various chloromethanes, will also involve the production of waste streams similar to those mentioned above and containing various chlorinated hydrocarbons together with ferric chloride, which may be utilized in the process as a chlorination or hydrochlorination catalyst, or result from corrosion.

In general, as mentioned above, it is common practice to concentrate the various waste streams, producing a residual product comprising the heavier chlorinated hydrocarbons, ferric chloride or other iron compounds and carbon, which is then generally disposed of by one or more means of incineration. However, the presence of amounts of ferric chloride or other iron salts in the residues to be incinerated can produce operating difficulties, and even serious problems.

In thermal incineration, the waste streams or residues are burned in a combustion furnace which is often equipped with one or more waste heat boilers. Ferric chloride or other iron compounds contained in the wastes may be converted under incinerator conditions to iron oxides which coat and cause pluggage of the waste heat boilers, requiring either extensive cleaning or replacement.

In processes in which the wastes are catalytically incinerated or oxidized, they are passed to a fluidized bed of catalytic material supported on an inert particulate support and burned at high temperatures. An overly high amount of iron can accumulate in the catalyst bed, requiring removal or replacement of the catalytic material on an undesirably frequent schedule.

In some plants, the difficulties of operating an incinerator (whether thermal or catalytic) to burn waste streams containing high amounts of ferric chloride has resulted in the only feasible method of incineration being that conducted at sea by incinerator ships such as the well known "Vulcanus". Such techniques are expensive and do not provide a means for recovering chlorine values from the waste. Furthermore, there are only several such ships functioning today, so that it is necessary to store wastes for a lengthy period of time and schedule use of these ships quite far in advance.

It is an objective of this invention, therefore, to provide a process for the treatment of such chlorinated hydrocarbon waste streams containing relatively heavy or high boiling chlorinated hydrocarbons together with substantial amounts of ferric chloride or other iron salts, to remove substantial portions of the iron component so as to make such streams more amenable for conventional incineration.

The prior art discloses a number of techniques for removal of ferric or other iron-containing materials from various chlorinated hydrocarbons. In most cases, however, the prior art is concerned with removal of such contaminants from streams containing primarily 1,2-dichloroethane or other desirable principal products.

Thus, for instance, U.S. Pat. No. 3,691,239 discloses that 1,2-dichloroethane containing iron can be treated with an adsorbent such as a clay or clay-related material, preferably alumina. U.S. Pat. No. 3,115,528 discloses steam distillation with ammonia to precipitate iron as ferric hydroxide. U.S. Pat. No. 3,647,895 involves the use of an anhydrous monoalkanolamine to remove iron impurities. British Pat. No. 1,380,497 performs this operation by adsorbing the iron-containing impurities on charcoal. A similar operation is performed in German Pat. No. 1,939,391. U.S. Pat. No. 4,307,261 describes use of a hydrocarbon or chlorinated hydrocarbon oil for this purpose.

It has been a practice in commercial vinyl chloride plants to treat 1,2-dichloroethane (produced by chlorination and/or oxychlorination) with dilute acid to remove iron-containing impurities and other undesirable products from the stream prior to passing it through light ends and/or heavy ends distillation. Such streams, emanating primarily from the "low temperature" type of chlorination, generally contain about 50 ppm ferric chloride. The acid solution is then neutralized and disposed of in the usual fashion. Such a process is disclosed, for instance, in Japanese Patent Publication No. 13606/1966.

In a "balanced process" for the production of vinyl chloride, there is additionally incorporated an oxychlorination process unit in which ethylene is reacted with air or oxygen and hydrogen chloride gas recovered from the effluent of the pyrolysis furnace. The principal products of this reaction comprise 1,2-dichloroethane and water, and the product stream may also include a small amount of unreacted ethylene and hydrogen chloride. This product stream, which emanates from the oxychlorination section in the gaseous form, is generally at least partially condensed into a mixture of 1,2-dichloroethane and water. Any unreacted hydrogen chloride wil be contained in the water phase. In such a "balanced process" this 1,2-dichloroethane product may be combined with the 1,2-dichloroethane produced from "low temperature" ethylene chlorination, thus at the same time effectuating the acid wash of the latter with the aqueous solution of hydrogen chloride produced in the oxychlorination process. The aqueous acid-containing portion is then phase separated from the organic layer, neutralized as mentioned above, and disposed in the customary fashion, while the organic layer containing primarily 1,2-dichloroethane is neutralized and passed to the distillation section.

Mention is also made in the prior art of the use of water for removing ferric chloride form 1,2-dichloroethane streams, but this has been found to be less than satisfactory, and recommended only with special procedures.

Japanese Patent Publication No. 13606/1966 discloses, for instance, that dilute acid is preferred over water for washing such a stream as emulsification between water and unpurified dichloroethane often occurs. German Pat. No. 2,540,292 states that an ordinary washing with water is not generally satisfactory for removing ferric chloride, hydrogen chloride and chlorine from 1,2-dichloroethane, but proposes that water may be used in an apparatus in which a multi-stage side channel pump working against gravity is employed, to effectuate an intimate mixing of water and dichloroethane. By the use of this special equipment, as described in the example of this patent, ferric chloride at a concentration of 250 ppm was removed from dichloroethane.

SUMMARY OF THE INVENTION

It has now been found that the ferric chloride content of liquid waste streams comprising higher boiling chlorinated hydrocarbons and containing amounts of ferric chloride, may be substantially reduced by contacting the waste stream with an amount of water sufficient to convert a substantial amount of the ferric chloride in said stream to solid ferric chloride hexahydrate, and then removing the solid hexahydrate from the waste stream.

DETAILED DESCRIPTION OF THE INVENTION

Figure 1:
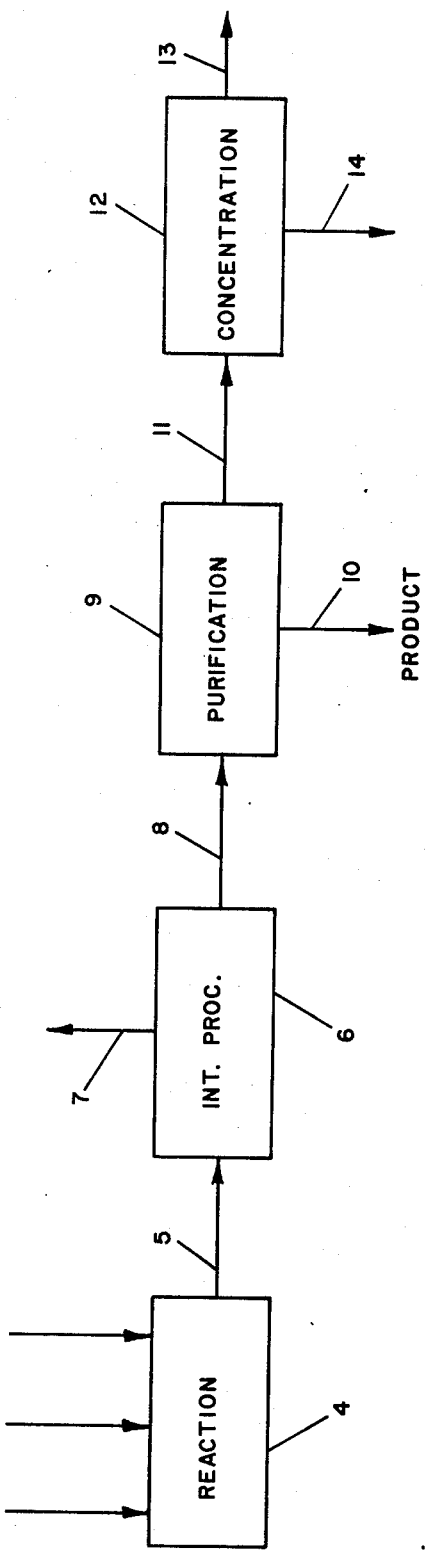
FIG. 1 depicts, for background, a typical general process diagram for production of chlorinated hydrocarbons, including the concentration of heavy ends produced in the process.

The processes described in FIG. 1 may be those utilized for production of any of a number of desirable chlorinated hydrocarbons, including production of 1,2-dichloroethane by chlorination of oxychlorination of ethylene; production of vinyl chloride by dehydrochlorination of 1,2-dichloroethane; production of 1,1-dichloroethane by chlorination of oxychlorination of ethylene; production of vinylidene chloride by dehydrochlorination of 1,1-dichloroethane; production of ethyl chloride by hydrochlorination of ethylene; production of higher chlorinated ethanes such as 1,1,1-trichloroethane, 1,1,2-trichloroethane, and tetrachloroethanes by additive chlorination of 1,2-dichloroethane; production of trichloroethylene and/or perchloroethylene, for instance by oxychlorination of 1,2-dichloroethane; production of allyl chloride by oxychlorination of propylene; production of chlorobutenes and/or chloroprene by oxychlorination, chlorination, and/or dehydrochlorination of various butanes; production of mono- and/or polychlorinated benzenes such as chlorobenzene, dichlorobenzene, etc., by chlorination or oxychlorination of benzene; production of chloromethanes including methyl chloride, methylene chloride, chloroform and/or carbon tetrachloride, by chlorination and/or oxychlorination of methane, optionally mixed with one or more chloromethanes, notably methyl chloride; production of methyl chloride by hydrochlorination of methanol. Alternatively, the process may be one for production of other chlorinated hydrocarbons such as mono- or polychlorinated biphenyls, and various chlorofluoro- or chlorobromo-hydrocarbons.

Referring to FIG. 1, there is introduced into a general reaction section 4, several feed streams. Stream 1 is generally a hydrocarbon and/or chlorinated hydrocarbon to be reacted. Stream 2 is a chlorination or hydrochlorination agent such as chlorine and/or hydrogen chloride. Stream 3 may be another reactant such as air and/or oxygen for utilization in an oxychlorination process.

The reaction products are conveyed via line 5 into an intermediate processing section 6 in which the products are treated by one or more steps such as quenching, condensation, washing with acid and/or water, neutralization, and drying. Liquid and/or gaseous wastes are withdrawn in line 7. The thus treated products are then conveyed via line 8 into a purification or distillation section 9 which comprises one or more distillation or fractionation columns for separating the desired product or products from impurities. The desired product or products are removed in line 10. "Heavy ends," that is, impurities generally boiling higher than the desired products, are taken off in line 11. This stream will usually contain a portion of the desired product or products in addition to the heavy ends. Stream 11 is passed into a concentration section 12, which will comprise one or more vessels such as kettles, often referred to by the term "tar stills", or optionally vacuum distillation columns, or other equipment utilized for the concentration of the higher boiling impurities. Any desirable chlorinated hydrocarbon product which is recovered is removed in line 14 and returned to the main process for further purification as necessary. From the concentration section there is removed a waste stream in line 13 which is then passed to a thermal incinerator or catalytic incinerator or oxidizing section for incineration or combustion.

As mentioned above, if the process being conducted is one for chlorination of ethylene at either "high temperature" or "low temperature" a number of waste streams are produced, including a purge stream from the ethylene chlorination reactor, a heavy ends bottoms product, a waste stream from a concentration section, or residues remaining after purification and recovery of uncracked 1,2-dichloroethane.

According to the invention, a waste stream as mentioned above is contacted with a sufficient amount of water to convert a substantial amount of the ferric chloride contained in said waste stream to solid ferric chloride hexahydrate.

Ferric chloride hexahydrate is quite insoluble in hydrocarbons in general, and chlorinated hydrocarbons in particular. If the waste stream is treated with just enough water to convert the ferric chloride to the hexahydrate form, the latter will precipitate as a solid and can readily be removed by filtration or centrifugation.

The amount of water added to perform this function is generally from about 7 to about 20 grams per gram of ferric chloride present in the waste stream. In a plant operation, the ferric chloride content in a waste stream to be treated may be determined from time to time and the amount of water added to said stream adjusted accordingly. Alternatively, the addition of water may be performed by automation, with continual analysis of the ferric chloride concentration of the stream at regular intervals, and automatic adjustment of the amount of water added to form the insoluble hexahydrate crystals.

In general, the treatment with water is conducted at ambient temperature, under ambient pressure.

Subsequent to the addition of water, the stream now containing insoluble ferric chloride hexahydrate is passed through an appropriately sized filter or centrifuge to remove these crystals, and optionally also any other solids which may be contained in the stream. The stream, now substantially reduced in ferric chloride content, may be passed for further processing such as incineration, or if necessary, additional treatment to further lower the ferric chloride concentration.

EXAMPLE

The following represents an example of the conduct of the process according to this invention.

A bottoms stream from a heavy ends column of an ethylene chlorination process was saturated with ferric chloride. The ferric chloride was present in the stream in approximately 2800 ppm.

This stream was contacted with water in amounts ranging from 2.0 to 5.0 grams water per 100 grams of organic material (heavy ends column bottoms). The waste stream, after treatment with water, was then passed through a 0.2 micron filter and analyzed for ferric chloride content. The following Table I shows the ferric chloride content of such a stream when treated with varying amounts of water.

TABLE I

| grams $H_2O$/100 q. organic material | (grams $H_2O$/ grams $FeCl_3$) | $FeCl_3$, wt. ppm. |
|---|---|---|
| 2.0 | 7.14 | 1800 |
| 3.0 | 10.71 | 1200 |
| 4.0 | 14.29 | 1800 |
| 5.0 | 17.86 | 1000 |

What is claimed is:

1. A process for reducing the ferric chloride content of liquid waste streams comprising higher boiling chlorinated hydrocarbons and containing amounts of ferric chloride, consisting essentially of contacting the waste stream with an amount of water sufficient to convert ferric chloride contained in said stream to solid ferric chloride hexahydrate, and then removing the solid hexahydrate by filtration or centrifugation from the waste stream.

2. A process according to claim 1 in which the hexahydrate is removed from the waste stream by filtration.

3. A process according to claim 1 in which the amount of water utilized to contact the waste stream is from about 7 to about 20 grams per gram of ferric chloride present in the waste stream.

4. A process according to claim 1 in which the waste stream results from the production of 1,2-dichloroethane by chlorination of ethylene.

5. A process according to claim 4 in which the waste stream is recovered from the bottoms of a heavy ends distillation section.

6. A process according to claim 4 in which the waste stream is obtained as a purge stream from the reactor in which ethylene is reacted with chlorine.

7. A process according to claim 1 in which the waste stream is obtained from a process for the pyrolysis of 1,2-dichloroethane to vinyl chloride.

* * * * *